United States Patent [19]

Murakami et al.

[11] Patent Number: 4,460,939
[45] Date of Patent: Jul. 17, 1984

[54] DEVICE FOR PRODUCING A LINE OF ILLUMINATION

[75] Inventors: Takashi Murakami; Takeshi Higuchi, both of Saitama, Japan

[73] Assignee: Fuji Photo Optical Co., Ltd., Saitama, Japan

[21] Appl. No.: 311,753

[22] Filed: Oct. 15, 1981

[30] Foreign Application Priority Data

Oct. 17, 1980 [JP] Japan .................. 55-145130

[51] Int. Cl.³ .................................. F21V 7/04
[52] U.S. Cl. ........................... 362/31; 362/32; 362/293; 362/294; 362/300
[58] Field of Search ............ 362/31, 32, 300, 293, 362/294

[56] References Cited

U.S. PATENT DOCUMENTS 4,110,026  8/1978  Farley .................. 362/31
4,241,382 12/1980  Daniel .................. 362/300
4,249,231  2/1981  Decaux ................. 362/31
4,333,130  6/1982  Mocnizuki ............. 362/31

FOREIGN PATENT DOCUMENTS 2559278  7/1977  Fed. Rep. of Germany ...... 362/31

Primary Examiner—Donald P. Walsh
Attorney, Agent, or Firm—Young & Thompson

[57] ABSTRACT

A device for providing a line of illumination in an optical reader, comprises an internally reflecting body having an elliptical reflecting surface joined to a part-cylindrical reflecting surface. A light source is disposed on one focal line of the elliptical surface, and a plate-like light guide has its light-receiving end disposed on the other focal line of the elliptical surface. One of the two focal lines of the elliptical surface is also the center of curvature of the part-cylindrical surface. The internal reflection and re-reflection of the light in the light guide ensures that the line of light emerging from the exit end of the light guide will be of uniform intensity throughout its length.

12 Claims, 7 Drawing Figures

FIG. 3
FIG. 4
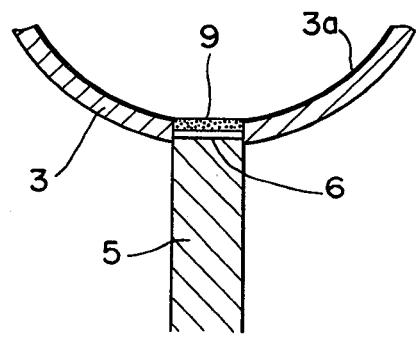
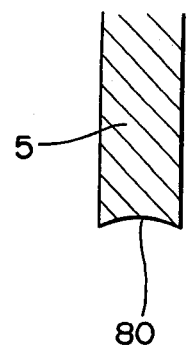
FIG. 5
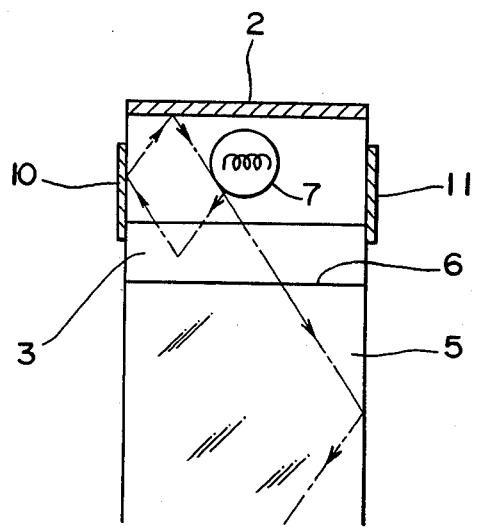

DEVICE FOR PRODUCING A LINE OF ILLUMINATION

The present invention relates to an illumination device which illuminates an object along a line for use in an optical apparatus to read image information recorded on the object.

In known image-information reading apparatus, there is provided an illumination device for the object to be read, such as a strip running linearly past a reader, in which the object is illuminated along a narrow line perpendicular to the direction of advance of the strip or other object. Such illumination devices usually comprise a lamp and a lens system, the rays emitted from the lamp being collected and directed along a line through a condenser lens system and a cylindrical lens element.

Such illumination devices should be simple in structure and efficient as to illumination; and it is obviously desirable that they be able to create a line of illumination which is of constant intensity along its entire length. Known devices, however, are complicated in structure and expensive. Moreover, although a concave mirror is disposed behind the light source in known devices, so as to capture and reflect forwardly the light that strikes them, the transmission of a great part of the luminous flux of the light source is lost because the forwardly inclined rays from the light source are to a large extent lost. Another disadvantage is that the line of light is of uneven illumination along its length, and specifically is brighter in the midportion of the line than at the ends of the line.

It is accordingly an object of the present invention to provide a device for producing a line of illumination, which line will be of uniform intensity of illumination along its entire length.

Another object of the present invention is the provision of such a device, which has high efficiency of illumination.

Still another object of the present invention is the provision of such a device, which functions without a lens system.

It is also an object of the present invention to provide such a device which will be simple in structure and low in cost.

Briefly, the objects of the present invention have been achieved, by providing an improved illumination device for use in an optical image information reading apparatus, comprising an elongated body having internal reflecting surfaces, the body being of uniform cross-sectional configuration throughout its length and the reflecting surfaces being comprised by an elliptical reflecting surface joined to a cylindrical reflecting surface, the two reflecting surfaces being concave toward each other. The elliptical reflecting surface thus has two focal lines, corresponding to the two foci of the ellipse which is the uniform cross-sectional configuration of the elliptical reflecting surface; and a light source is disposed on one of those focal lines. The other focal line of the ellipse lies on the inlet end of a plate-like light guide with internally reflecting surfaces, the plane of the light guide including both focal lines. The center of curvature of the part-cylindrical reflecting surface lies on one of the two focal lines of the ellipse, preferably the same one as the light source.

Preferably, the elongated body is hollow and has reflecting surfaces confronting the light source. Alternatively, it can be solid, with the light source embedded or otherwise disposed therein, its reflective surfaces functioning by internal reflection. Similarly, it is preferred that the light guide be a solid flat plate of transparent material whose polished outer surfaces render it internally reflective; however, the light guide can also be hollow with reflective internal surfaces.

In any event, incident light rays pass through the light guide while repeating many internal reflections and rereflections, so that the line of light emerging from the exit end of the light guide is of uniform illumination throughout its length.

Other objects, features and advantages of the present invention will become apparent from a consideration of the following description, taken in connection with the accompanying drawings, in which:

FIG. 3 is a fragmentary cross-sectional view of the entry end of the light guide;

FIG. 4 is a fragmentary cross-sectional view of the exit end of the light guide;

FIG. 5 is a fragmentary cross-sectional view taken in the plane of the foci of the elliptical surface and showing the use of side mirrors on the device;

Figure 1:
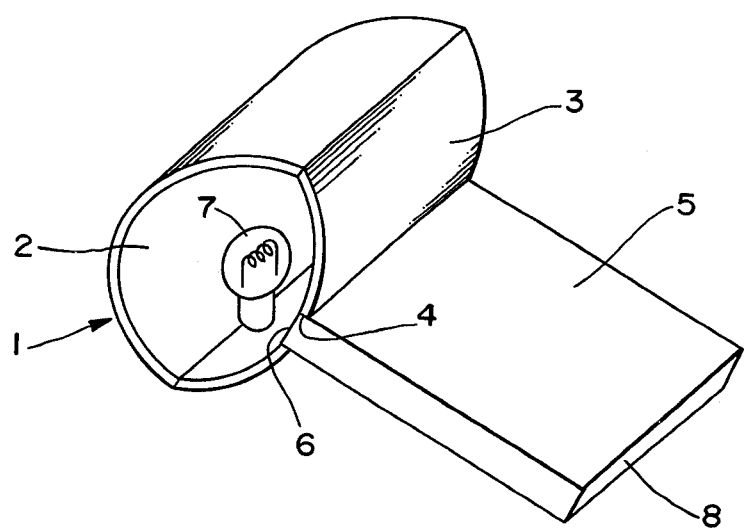
FIG. 1 is a diagrammatic perspective view of a preferred embodiment of the present invention.

Referring now to the drawings in greater detail, there is shown a device for producing a line of illumination according to the present invention, comprising an elongated reflecting body 1 which is comprised by an elliptical reflecting member 2 of uniform elliptical cross section throughout its length, which is joined at its forward or open end with a confronting cylindrical reflecting member 3. In the illustrated embodiment, body 1 is hollow and the internal surfaces 2a and 3a of members 2 and 3 are coated with a mirror-like reflecting layer. It is thus preferred that body 1 be comprised by two members 2 and 3 joined along their edges; however, body 1 can instead be comprised by a unitary transparent block whose outer polished elliptical and cylindrical surfaces impart internal reflectivity to the block in the manner of a prism.

Cylindrical member 4 has a straight narrow aperture 4 in the shape of a slot, in which the end of a plate-like light guide 5 is firmly secured, for instance by cementing, in such a manner that the end face 6 of light guide 5 is disposed in one of the two focal planes F1 and F2 of elliptical member 2. A light source 7 is disposed on the other of focal lines F1 and F2, in this case and preferably the focal line F1; and the light rays emitted by light source 7 that fall directly on end face 6 of light guide 5 will of course be transmitted directly through light guide 5. The internal surfaces 2a and 3a of members 2 and 3 are coated with a mirror-like reflecting layer which may be of the well known so-called "cold light" type mirror, which reflects radiation in the visible range but transmits radiation in the infra-red range. Thus, only the so-called "cold" light is reflected, and not the heat rays.

Figure 2:
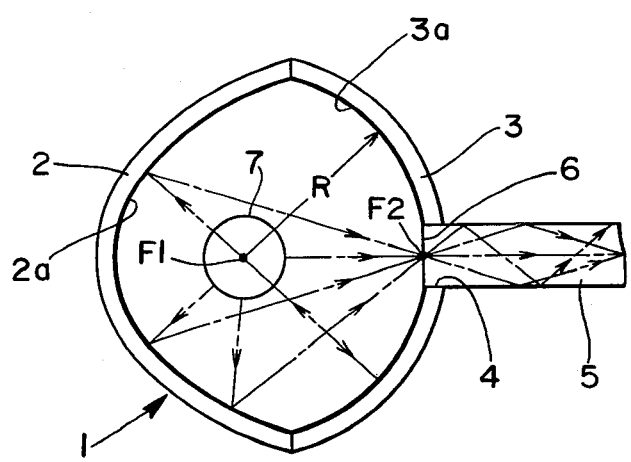
FIG. 2 is a diagrammatic side elevational view thereof, showing in particular the optical paths.

As best seen in FIG. 2, the light source 7, for instance a halogen lamp, is disposed on focal line F1 of the ellipse; whilst the other focal line F2 of the ellipse lies on end 6 of light guide 5, at which point the image of the filament of light source 7 is of course focussed. This front surface 6 of light guide 5 is a frosted or diffusing surface, as is conventional in the art. The line which is the center of curvature of cylindrical member 3 coincides with focal line F1 of the elliptical member; and so light source 7 lies also on the focal line of the cylindrical member. Preferably, the distance between focal lines F1 and F2 is equal to the radius of curvature R of the cylindrical member.

Apart from the light rays from light source 7 that directly enter light guide 5, the light rays emitted from light source 7 will be largely reflected either by surface 2a or by surface 3a. Those initially reflected by 2a will be reflected to focal line F2; whilst those initially reflected by 3a will be reflected to F1 and thence to F2. From F2, the light proceeds into light guide 5 as indicated by the lines in FIG. 2, and will be reflected and re-reflected so many times that the light emerging from the exit end of light guide 5 will be of substantially uniform illumination along the entire length of the illuminated line thus produced.

As seen in FIG. 3, the front or entry end of light guide 5 can be provided with a heat absorbing filter 9 spaced a small distance therefrom, so that the image of the filament on filter 9 will be out of focus and hence heat will be better absorbed than if the image of the filament were focussed on filter 9. A diffusing surface can be provided on the front surface of filter 9 instead of on the end face 6 of light guide 5. A heat absorbing filter can also be provided in front of the opposite end face of light guide 5.

Light guide 5 can be in the form of a glass plate or plate of acrylic resin with polished transparent surfaces except end face 6, or it can be in the form of a plate-like hollow pipe with walls having internal reflecting surfaces. As the image of the filament is focussed on end face 6 of light guide 5, the thickness of light guide 5 should be equal to or slightly greater than the width of the focussed image of the filament, so that end face 6 can receive the entire focussed image of the filament.

FIG. 4 shows the exit end of light guide 5, which is provided with a concave end face 80 so as to diminish losses of light due to internal reflection thereby.

FIG. 5 shows how to capture the light that would otherwise pass from the ends of body 1, by providing side mirrors 10 and 11 one at each end of body 1. The mirrors 10 and 11 do not completely fill the ends of body 1, but rather leave openings about themselves through which heat from within body 1 can escape.

Figure 6:
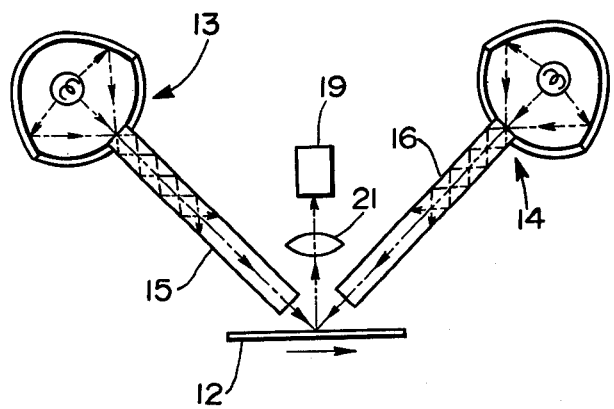
FIG. 6 is a diagrammatic view showing an optical image information reading apparatus in which the present invention can be used.

FIG. 6 shows an optical image information reading apparatus with which the invention can be used. In this apparatus, a pair of illumination devices 13 and 14 according to the invention is used, with their light guides 15 and 16 disposed at equal opposite angles on either side of the plane perpendicular to the surface to be illuminated along the line of illumination. Thus, the object 12 to be read, which passes at a fixed speed in the direction of the lower arrow in FIG. 6, that is, perpendicular to the reading plane defined by the reflected rays, is uniformly illuminated along that illuminated line, without any shadows being cast due to irregularities in the illuminated surface.

The reflected illumination from the illuminated line is then focussed on a light-receiving device 19 through a lens 21. A CCD line image sensor can, for example, be employed as a light-receiving device 19 in order to scan electrically the line image and thus to convert information from the line image electrically detected thereby, into time series signals. This reading and information retrieval aspect of the present invention, however, is entirely conventional and forms no part of the present invention and so need not be described in greater detail.

Figure 7:
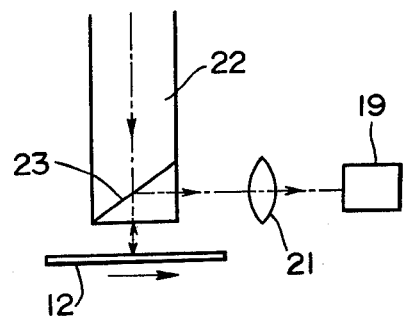
FIG. 7 is a diagrammatic view showing another embodiment of the exit end of the light guide.

FIG. 7 shows another embodiment of the invention, in a somewhat different optical image information reading apparatus, wherein the illumination device according to the invention is substantially in alignment with the direction initially taken by the reflected light, that is, is perpendicular to the line of movement of the object 12 to be read. In this case, a light guide 22 is provided that includes a half mirror 23 at an angle to the end thereof, to reflect light received from the object 12 to be read, while still transmitting to object 12 the light that passes through the light guide. The light rays reflected by half mirror 23 are directed to the same light-receiving device 19 through lens 21, as described above, to be converted into electrical signals.

From a consideration of the foregoing disclosure, therefore, it will be evident that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

We claim:

1. A device for producing a line of illumination, comprising a body having elliptical and cylindrical reflecting surfaces confronting each other, the elliptical surface having two spaced parallel focal lines, a light source disposed on one of said focal lines, a light guide in the form of a plate disposed in the plane of said focal lines and having a light inlet end which lies substantially on the other focal line of said elliptical surface, one of said focal lines being coincident with the center of curvature of said cylindrical surface, flat mirrors disposed at both ends of said body, openings between the mirrors and the two concave members through which heat from within the body can escape, said light guide being of transparent acrylic resin having a polished outer surface for internally reflecting light rays, and a heat-absorbing filter spaced a small distance in front of the light inlet end of said light guide, whereby the image of the light source on the filter will be out of focus and hence heat will be better absorbed than if the image of the light source were focussed on the filter.

2. A device as claimed in claim 1, in which said light source is disposed at the center of curvature of said cylindrical surface.

3. A device as claimed in claim 1, the distance between said focal lines being substantially equal to the radius of curvature of said cylindrical surface.

4. A device as claimed in claim 1, said body comprising two concave members joined along their edges.

5. A device as claimed in claim 4, in which said reflecting surfaces are coated with a reflecting layer that reflects visible light but transmits infra-red radiation.

6. A device as claimed in claim 1, in which said body is solid and has polished spherical and elliptical surfaces that reflect light by internal reflection.

7. A device as claimed in claim 1, said inlet end of said light guide having a width about the width of the image of said light source that is focussed thereon.

8. A device as claimed in claim 1, said light guide having a light-diffusing inlet end.

9. A device as claimed in claim 1, said light guide having an exit end having a concave surface to reduce internal reflection at said exit end.

10. A device as claimed in claim 1, said light guide having mirror means at an angle to its length adjacent its light outlet end thereby to reflect light rays laterally from the object illuminated by said device.

11. A device as claimed in claim 1, said inlet end of said light guide being disposed in a slot through said cylindrical surface.

12. A device as claimed in claim 1, in which said light source is a light bulb.

* * * * *